Aug. 7, 1956      S. W. GARRIGUS      2,758,249
DECELERATION INDICATOR FOR AUTOMOTIVE VEHICLE
Filed July 25, 1955
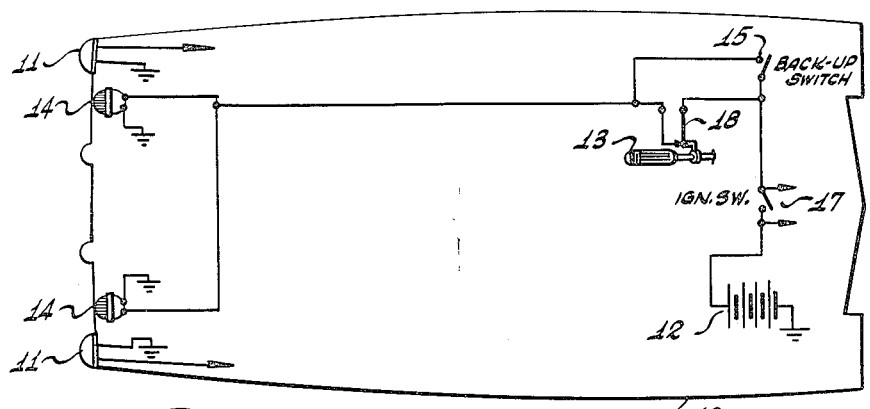
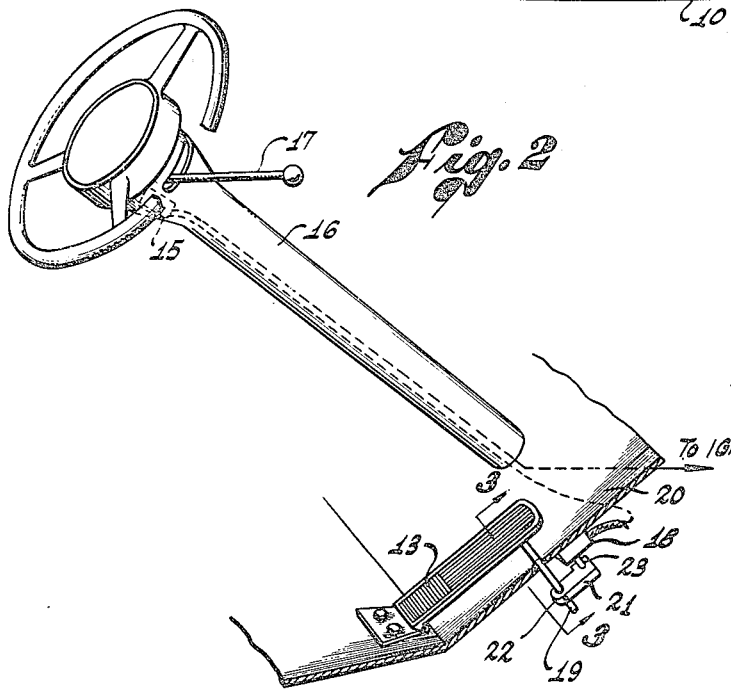
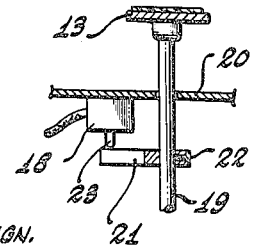
INVENTOR.
SAMUEL W. GARRIGUS
BY
Attorney United States Patent Office 2,758,249
Patented Aug. 7, 1956

2,758,249

DECELERATION INDICATOR FOR AUTOMOTIVE VEHICLE

Samuel W. Garrigus, Inglewood, Calif.

Application July 25, 1955, Serial No. 524,043

1 Claim. (Cl. 315—80)

This invention relates to a signal system for visually indicating deceleration of an automotive vehicle.

Present day automobile travel, especially in populated areas, involves frequent changes in vehicle speed, and accidents often result from the unawareness of a driver to the slowing down of a vehicle immediately in front of his own.

Drivers are, of course, warned of deceleration of a preceding vehicle, where such deceleration results from braking of the latter, by lighting of its rear stop lights. If the distance between the vehicles is consistent with the speed of the vehicles, the warning afforded by the stop lights will enable the trailing driver to decelerate his vehicle sufficiently to avoid hitting the car ahead.

When, however, deceleration of a vehicle results merely from release of the throttle pedal, no indication of speed change is given to a following car other than the actual change in the rate of movement of the vehicle. Perception of a change in the rate of movement of a car requires relatively prolonged observation, as compared with the instantaneous indication afforded by brake lights, for example, and also becomes increasingly difficult as the distance between vehicles increases.

Awareness of changes in speed of vehicles is especially critical on expressways and freeways where the normal rate of speed of vehicles is relatively high, and frequent decelerating of the vehicles is generally necessary during peak traffic hours. Because of the normal high rate of speed of the vehicles, the safe distance between them is relatively great, as it relates to the difficulty of perceiving changes in the speed of vehicles, and yet relatively small, insofar as the time required for a car traveling at that speed to cover the distance, is concerned.

Many highway accidents could, therefore, be avoided if each vehicle were equipped with a signal system for indicating when the accelerator pedal is released to effect deceleration.

I am aware of one such signal system, which, however, has not been widely accepted owing to its relatively small size and high cost.

An object of this invention is, accordingly, the provision of an improved deceleration indicating system for automotive vehicles.

Another object is the provision of a vehicle deceleration indicating system for automotive vehicles which is operated in response to movement of the accelerator pedal of the vehicle into the idle or other set positions.

Yet another object is the provision of a system for visibly indicating retraction of the accelerator pedal of an automotive vehicle to decelerate the latter and wherein the visual indication is provided by lighting of the back-up lights which are supplied as standard equipment of most present day cars.

A further object of the invention is the provision of a deceleration signal light system as in the foregoing which may be sold as a separate accessory or furnished as standard equipment, which is inexpensive to manufacture and easy to assemble on the car, and wherein the signal lights are still capable of performing as back-up lights.

The invention may be best understood from the following detailed description thereof taken in conjunction with the annexed drawings, wherein:

Fig. 1 is a schematic circuit diagram of the invention;

Fig. 2 is a perspective view partially in section of the steering and throttle controls of an automotive vehicle showing one manner of mounting the switch mechanism of the invention; and Fig. 3 is a section taken along line 3—3 of Fig. 2.

Referring now to these drawings, the numeral 10 indicates an automotive vehicle, shown in outline form, which is conventionally provided with rear stoplights 11 that are energized from a battery 12 by depression of a brake pedal (not shown), and with an accelerator pedal 13.

Also mounted at the rear of the vehicle 10 is a pair of so-called back-up lights 14 which are adapted to be energized from the battery 12 when the transmission of the car is put into reverse so as to illuminate the area rearwardly of the car.

The illustrative embodiment of the invention contemplates these back-up lights as being of the type which are assembled on the car at the time of its manufacture and operated in the conventional manner by actuation of a switch 15, located in some cars in the steering column 16, upon movement of the shift lever 17 to its reverse position.

As schematically shown in Fig. 1, the back-up lights 14 have one terminal grounded and their other terminal connected to one terminal of the battery 12 through the back-up light switch 15 in series with the ignition switch 17. The other terminal of battery 12 is grounded in the conventional manner, as shown. It will be apparent, therefore, that with the ignition switch 17 in its "on" position, the back-up lights 14 will be lit whenever switch 15 is closed by movement of shift lever 17 to its reverse position.

I propose the connection of a further switch 18 in parallel with the back-up light switch 15 so that with the ignition switch 17 closed, the back-up lights 14 may be lit by closing either one of the switches 15 or 18.

Switch 18 is associated with the accelerator pedal 13 in a manner to be closed whenever the latter is retracted to a given position which preferably is the idle position. To this end, the throttle actuating link 19, connected to the pedal 13 and passing through the floorboard 20 of the vehicle, has slidably received thereon an adjustable abutment or stop 21 which is adapted to be fixed in adjusted position on the link 19 by a set screw 22. The housing of switch 18 is secured to the underside of floorboard 20 and is positioned so that its actuating plunger 23 is engaged by the stop 21 to close switch 18 when the throttle pedal is in its idle position.

The above described mounting of switch 18 is illustrative only, it being apparent that the switch may be variously positioned to accomplish the ends of the invention. For example, to permit complete retraction of the pedal 13 when the switch is closed by movement of the pedal to a position not the idle position, a suitable switch would be mounted out of the path of the stop 21 with only its actuating plunger positioned in such path to be moved to closed position by the stop when the pedal is moved toward retracted position and to open position when the pedal is depressed.

In practice, the back-up lights would preferably, though not necessarily, emit an amber colored light. This could be accomplished, for example, by tinting the lens of the lights. In order, however, that such lights retain their usefulness as back-up lights, the method employed for causing the lights to emit amber or other colored light should not result in any substantial reduction in the intensity of the light emitted so that the area behind the car may be effectively illuminated when it is desired to move the car in reverse.

While the illustrative embodiment of the invention has related to automotive vehicles which have back-up lights as standard equipment, it will be apparent that the invention is equally applicable to vehicles on which back-up lights have been mounted as separate accessories embodying, for example, a manual back-up light switch.

Operation of the invention will be apparent from the foregoing description. Movement of the accelerator pedal 13 to its idle position will bring stop 21 into engagement with plunger 23 to close switch 18 and illuminate lights 14. Lighting of these lights will furnish to the driver of a following car an indication that the vehicle in front of him is decelerating so that he will decelerate his car accordingly. Lights 14 may also be lit by shifting of the car to reverse to illuminate the area behind the latter.

Obviously, numerous modifications of the invention are possible in light of the foregoing teachings. It is to be understood, therefore, that within the scope of the following claim, the invention may be practiced otherwise than as specifically described and illustrated herein.

I claim:

In an automotive vehicle having an accelerator pedal, a battery, and at least one backup light including a filament mounted at the rear of the vehicle, one terminal of said filament being electrically connected to one terminal of the battery, and electrical conductor means connecting the other terminal of said filament to the other terminal of the battery, said electrical conductor means comprising a pair of normally open switches connected in electrical parallel whereby said filament is energized by closing of either of said switches, one of said switches comprising a manually operable backup switch, and means operatively connecting the other of said switches and the accelerator pedal of the vehicle for closing of said other switch when the accelerator pedal is retracted to a given position and re-opening of said other switch when said pedal is depressed beyond said given position.

References Cited in the file of this patent

UNITED STATES PATENTS

| | | |
|---|---|---|
| 1,785,397 | Shoenberg | Dec. 16, 1930 |
| 2,231,429 | Simmons | Feb. 11, 1941 |
| 2,422,971 | Chessrown | June 8, 1948 |